(12) United States Patent
Baraty et al.

(10) Patent No.: US 10,528,454 B1
(45) Date of Patent: Jan. 7, 2020

(54) INTELLIGENT AUTOMATION OF COMPUTER SOFTWARE TESTING LOG AGGREGATION, ANALYSIS, AND ERROR REMEDIATION

(71) Applicant: FMR LLC, Boston, MA (US)

(72) Inventors: Ali A. Baraty, Stoneham, MA (US); Abhishek Chitlur Setty, Apex, NC (US); Balaji Chandra Sekaran, North York (CA); Sathish Thyagarajan, Charlotte, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/168,597

(22) Filed: Oct. 23, 2018

(51) Int. Cl.
  *G06F 9/44* (2018.01)
  *G06F 15/173* (2006.01)
  (Continued)

(52) U.S. Cl.
  CPC ............ *G06F 11/3684* (2013.01); *G06F 8/30* (2013.01); *G06F 8/71* (2013.01); *G06F 9/542* (2013.01); *G06F 9/546* (2013.01); *G06F 11/0706* (2013.01); *G06F 11/0793* (2013.01); *G06F 11/3476* (2013.01); *G06F 11/3608* (2013.01);
  (Continued)

(58) Field of Classification Search
  CPC ............... G06F 11/3684; G06F 11/368; G06F 11/3414; G06F 11/3409; G06F 11/3672; G06F 11/3664; G06F 11/3688; G06F 11/3692; G06F 11/3668
  See application file for complete search history.

(56) References Cited

U.S. PATENT DOCUMENTS

| 7,996,093 B2 * | 8/2011 | Govindaraj | ........ G05B 19/0426 700/1 |
| 7,996,814 B1 * | 8/2011 | Qureshi | ................ G06F 11/079 717/120 |

(Continued)

OTHER PUBLICATIONS

Diego Castro et al., Analysis of test log information through interactive visualizations, May 28-29, 2018, [Retrieved on Sep. 10, 2019]. Retrieved from the internet: <URL: https://dl.acm.org/citation.cfm?id=3196345> 11 Pages (156-166) (Year: 2018).*

(Continued)

*Primary Examiner* — Anibal Rivera
(74) *Attorney, Agent, or Firm* — Proskauer Rose LLP (57) ABSTRACT

Methods and apparatuses are described for intelligent automation of computer software testing log aggregation, analysis, and error remediation. A client device generates test log files for software automation testing tools, each test log file comprising errors generated by execution of test scripts. The client device creates an archive file with the log files and transmits the files to a server. The server extracts the files from the archive file and parses each of the files to identify errors. The server aggregates errors from at least two of the files and transmits the aggregated errors to a log management message queue and a development message queue. The server generates a user interface and transmits the user interface to a remote device. The server also generates development change orders that, when executed by the server, create tasks in a development tracking system to resolve errors by changing development source code.

18 Claims, 9 Drawing Sheets

(51) Int. Cl.
*G06F 11/36* (2006.01)
*G06F 11/34* (2006.01)
*G06F 11/07* (2006.01)
*G06F 17/27* (2006.01)
*G06F 9/54* (2006.01)
*G06F 8/30* (2018.01)
*G06F 8/71* (2018.01)

(52) U.S. Cl.
CPC ...... *G06F 11/3688* (2013.01); *G06F 11/3692* (2013.01); *G06F 17/2705* (2013.01); *G06F 2201/835* (2013.01)

(56) References Cited

U.S. PATENT DOCUMENTS

| | | | |
|---|---|---|---|
| 8,312,322 B2 | 11/2012 | Gururaj | |
| 2007/0079291 A1* | 4/2007 | Roth | G06F 11/3668 717/124 |
| 2007/0083630 A1* | 4/2007 | Roth | G06F 11/3688 709/223 |
| 2007/0083631 A1* | 4/2007 | Maccaux | G06F 11/3688 709/223 |
| 2007/0083633 A1* | 4/2007 | Roth | G06F 11/3688 709/223 |
| 2007/0083634 A1* | 4/2007 | Roth | G06F 11/3688 709/223 |
| 2007/0083793 A1* | 4/2007 | Roth | G06F 11/3414 714/25 |
| 2007/0234293 A1* | 10/2007 | Noller | G06F 11/3688 717/124 |
| 2009/0144699 A1 | 6/2009 | Fendt et al. | |
| 2009/0199047 A1* | 8/2009 | Vaitheeswaran | G06F 11/3409 714/47.2 |
| 2009/0199160 A1* | 8/2009 | Vaitheeswaran | G06F 11/3414 717/124 |
| 2012/0030515 A1* | 2/2012 | Birakoglu | G06F 11/368 714/38.1 |
| 2012/0222014 A1* | 8/2012 | Peretz | G06F 11/3684 717/125 |
| 2013/0159974 A1* | 6/2013 | Norton | G06F 11/3684 717/124 |
| 2014/0109053 A1* | 4/2014 | Vasudevan | G06F 11/3664 717/124 |
| 2014/0365828 A1 | 12/2014 | Jiang et al. | |
| 2015/0100829 A1* | 4/2015 | Nanjundappa | G06F 11/3688 714/38.1 |
| 2015/0100830 A1* | 4/2015 | Nanjundappa | G06F 11/3688 714/38.1 |
| 2015/0100831 A1* | 4/2015 | Nanjundappa | G06F 11/3684 714/38.1 |
| 2015/0100832 A1* | 4/2015 | Nanjundappa | G06F 11/3688 714/38.14 |
| 2017/0139819 A1* | 5/2017 | D'Andrea | G06F 11/3688 |
| 2018/0004648 A1* | 1/2018 | Kidron | G06F 11/368 |
| 2018/0189170 A1* | 7/2018 | Dwarakanath | G06F 11/3664 |
| 2018/0246803 A1* | 8/2018 | Zhang | G06F 11/3672 |
| 2018/0322037 A1* | 11/2018 | Thazhathekalam | G06F 11/3688 |
| 2018/0329807 A1* | 11/2018 | Atyam | G06F 11/3676 |
| 2018/0349256 A1* | 12/2018 | Fong | G06F 11/3684 |
| 2019/0034320 A1* | 1/2019 | Stokes | G06F 11/3664 |
| 2019/0065357 A1* | 2/2019 | Brafman | G06F 11/3692 |

OTHER PUBLICATIONS

Boyuan Chen et al., An automated approach to estimating code coverage measures via execution logs, Sep. 3-7, 2018, [ Retrieved on Sep. 10, 2019]. Retrieved from the internet: <URL: https://dl.acm.org/citation.cfm?id=3238214> 12 Pages (305-316) (Year: 2018).*
Jayathilake, Dileepa, "A Mind Map Based Framework for Automated Software Log File Analysis," 2011 International Conference on Software and Computer Applications (IPCSIT), vol. 9 (2011), 6 pages.
Li, Weixi, "Automatic Log Analysis using Machine Learning," Department for Information Technology, Uppsala Universitet, Nov. 2013, 50 pages.

* cited by examiner

| Timestamp | Source | Debug-Info | Failure-Reason | Tool |
|---|---|---|---|---|
| 2017-12-01 10:23:18 | vc2coma2265792n | PeerComparisonProgress Bar() | Workspace.PeerComparison ProgressBar():Balance has no progress bar | SAH |

302 → Timestamp
304 → Source
306 → Debug-Info, Failure-Reason
308 → Tool

INTELLIGENT AUTOMATION OF COMPUTER SOFTWARE TESTING LOG AGGREGATION, ANALYSIS, AND ERROR REMEDIATION

TECHNICAL FIELD

This application relates generally to methods and apparatuses, including computer program products, for intelligent automation of computer software testing log aggregation, analysis, and error remediation.

BACKGROUND

Automated testing and analysis of complex computer software source code using automation scripts is crucial to understanding the functional impact of source code changes across a wide variety of systems in a timely and efficient manner. Typically, automation testing tools (e.g., Sahi™, Selenium™) automatically execute test scripts against software in development to identify errors, bugs, and other defects with the software before it is deployed to a production computing environment. Such automation testing tools generally create one or more test log files during execution of the scripts that contain data elements associated with the testing—like error messages, file names, path names, and module/code identification. Each automation testing tool generates its own log file(s) with a preferred, or in some cases, proprietary syntax and/or file format.

A typical enterprise application is made up of multiple layers/components (e.g., User Interface, Mid-tier web services, database, message queues, infrastructure components, etc.) that depend on each other for the application to work holistically. In complex computing environments that utilize a plurality of automation testing tools, it takes significant effort to parse each individual log file to ascertain each of the errors and also to consolidate the errors from each of the log files. Furthermore, such effort typically does not provide an easy-to-understand visualization of the entire automation tool/test script execution process, and an actionable command for remediation of the identified errors. Currently, there are no tools to aggregate and analyze log files generated by a plurality of distinct automation testing tools during execution of scripts against software source code, to quantify the impact of errors created in the log files for a production computing environment in a meaningful and easy-to-understand framework, and to automatically create computerized remediation tasks based upon the error analysis. A typical enterprise application is made up of multiple layers/components (e.g., User Interface, Mid-tier web services, database, message queues, infrastructure components, etc.) that depend on each other for the application to work holistically.

SUMMARY

Therefore, what is needed are methods and systems for an intelligent test log aggregation and analysis engine to perform automated, intelligent automation of computer software testing log aggregation, analysis, and error remediation. The methods and systems described herein efficiently provide a seamless, simplified approach to capturing automation tool errors across a suite of independent automation testing tools (regardless of log file format, syntax, or protocol), to provide an intuitive user interface that displays the aggregated log file information in an easy-to-understand dashboard, and to generate actionable computer-based processes and tasks to automatically remediate identified errors in the log files. The techniques described herein provide the capability to connect errors/bugs/defects occurring on various application layers and to show their dependencies with one another—which provides a significant technical improvement in terms of software error detection and prevention across layers. The system simplifies how the errors are connected from one layer of the application to another layer and greatly improves the defect triage process.

In addition, the methods and systems described herein provide an extensive feedback mechanism that is not currently available in existing computer software testing tools:

Aggregated testing logs from software automation tools are being pushed to elasticsearch db and using open source tools such as Graylog and/or Kibana for data visualization and trending analysis. This helps generate advanced reporting and trending analysis reports.
  Automatically transmit testing results to the development team (e.g., via email) so everyone has first-hand information on test results.
  Dynamic alerting to remote devices based on specific testing log messages—including opening tickets/defect notifications to specific development groups using a software-based ticket/defect management system.
  Uploading of test results to any test management system (e.g., Quality Center, Microsoft Test Manager, etc.) which supports ISO-27001 audit requirements.
  Extracting test metrics from the associated logs and expose the metrics to a web-based, front-end dashboard for executives and higher management to understand the health of the application.
  Providing a central location for the test logs and reports generated by test execution from various computer machines that including those provisioned using cloud service providers like Amazon Web Services and the like.

The invention, in one aspect, features a system for intelligent automation of computer software testing log aggregation, analysis, and error remediation. The system includes a client computing device and a server computing device, each having a memory for storing computer-executable instructions and a processor that executes the computer-executable instructions. The client computing device generates a plurality of test log files for each of a plurality of independent computer software automation testing tools that execute one or more test scripts against a development source code base, each test log file comprising one or more errors generated by execution of the test scripts. The client computing device generates a set of metadata associated with the execution of the test scripts for each of the plurality of test log files, the metadata comprising one or more test execution characteristics. The client computing device creates a data archive file in the memory that comprises the plurality of test log files and the metadata, and automatically generates a connection request for a server computing device upon creation of the data archive file. The server computing device validates, using a service locator process, the connection request received from the client computing device via a network connection. The server computing device identifies an address of an application programming interface executing on the server computing device to receive the data archive file and redirect the network connection to the identified address of the application programming interface. The application programming interface extracts the plurality of test log files and the metadata from the data archive file and parses each of the plurality of test log files to identify one or more errors in the test log files.

The application programming interface aggregates one or more errors from at least two of the plurality of test log files using the metadata. The application programming interface converts each set of aggregated errors into an event message and assign the event message to a log management message queue executing on the server computing device, the log management message queue automatically transmitting each event message to a log management and visualization module executing on the server computing device. The application programming interface converts each set of aggregated errors into a remediation message and assign the remediation message to a development message queue executing on the server computing device, the development message queue automatically transmitting each remediation message to a source code change control module executing on the server computing device. The log management and visualization module generates a user interface comprising a table grouping the event messages based upon the test execution characteristics stored in the metadata and transmit the user interface to a remote computing device for display. The source code change control module generates development change orders based upon the remediation messages, each development change order comprising programmatic instructions that, when executed by the source code change control module, create one or more tasks in a software development tracking computing device to resolve one or more errors in the remediation messages by changing at least a portion of the development source code base.

The invention, in another aspect, features a computerized method of intelligent automation of computer software testing log aggregation, analysis, and error remediation. A client computing device generates a plurality of test log files for each of a plurality of independent computer software automation testing tools that execute one or more test scripts against a development source code base, each test log file comprising one or more errors generated by execution of the test scripts. The client computing device generates a set of metadata associated with the execution of the test scripts for each of the plurality of test log files, the metadata comprising one or more test execution characteristics. The client computing device creates a data archive file in the memory that comprises the plurality of test log files and the metadata, and automatically generates a connection request for a server computing device upon creation of the data archive file. A server computing device coupled to the client computing device validates, using a service locator process, the connection request received from the client computing device via a network connection. The server computing device identifies an address of an application programming interface executing on the server computing device to receive the data archive file and redirect the network connection to the identified address of the application programming interface. The application programming interface extracts the plurality of test log files and the metadata from the data archive file and parses each of the plurality of test log files to identify one or more errors in the test log files. The application programming interface aggregates one or more errors from at least two of the plurality of test log files using the metadata. The application programming interface converts each set of aggregated errors into an event message and assign the event message to a log management message queue executing on the server computing device, the log management message queue automatically transmitting each event message to a log management and visualization module executing on the server computing device. The application programming interface converts each set of aggregated errors into a remediation message and assign the remediation message to a development message queue executing on the server computing device, the development message queue automatically transmitting each remediation message to a source code change control module executing on the server computing device. The log management and visualization module generates a user interface comprising a table grouping the event messages based upon the test execution characteristics stored in the metadata and transmit the user interface to a remote computing device for display. The source code change control module generates development change orders based upon the remediation messages, each development change order comprising programmatic instructions that, when executed by the source code change control module, create one or more tasks in a software development tracking computing device to resolve one or more errors in the remediation messages by changing at least a portion of the development source code base.

Any of the above aspects can include one or more of the following features. In some embodiments, the address of an application programming interface executing on the server computing device comprises an HTTP address. In some embodiments, parsing each of the plurality of test log files to identify one or more errors comprises, for each test log file: determining a computer software automation testing tool that generated the test log file, based upon the metadata associated with the test log file, configuring the application programming interface to interpret the test log file using one or more rules specific to the determined computer software automation testing tool, scanning each line of the test log file to match one or more of: an error keyword or an error ID in the line to one or more of the rules, and extracting the lines of the test log file that comprise an error keyword or an error ID that match the rules as identified errors. In some embodiments, aggregating one or more errors from at least two of the plurality of test log files comprises determining that one or more identified errors from each of two or more test log files result from a single error event, based upon one or more of: a timestamp or an application name associated with the identified errors in the metadata, and grouping the identified errors together based upon the timestamp or the application name.

In some embodiments, the identified errors are grouped into a hierarchy arranged according to the computer software automation testing tool that generated the error. In some embodiments, converting each set of aggregated errors into an event message comprises wrapping the set of aggregated errors into a messaging protocol used by the log management message queue, including generating one or more packets each comprising a header, a footer, and a body with at least a portion of the set of aggregated errors. In some embodiments, the log management message queue automatically transmits each event message to the log management and visualization module upon detecting that the event message has been placed into the log management message queue.

In some embodiments, converting each set of aggregated errors into a remediation message comprises wrapping the set of aggregated errors into a messaging protocol used by the development message queue, including generating one or more packets each comprising a header, a footer, and a body with at least a portion of the set of aggregated errors. In some embodiments, the development message queue automatically transmits each remediation message to the source code change control module upon detecting that the remediation message has been placed into the development message queue.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
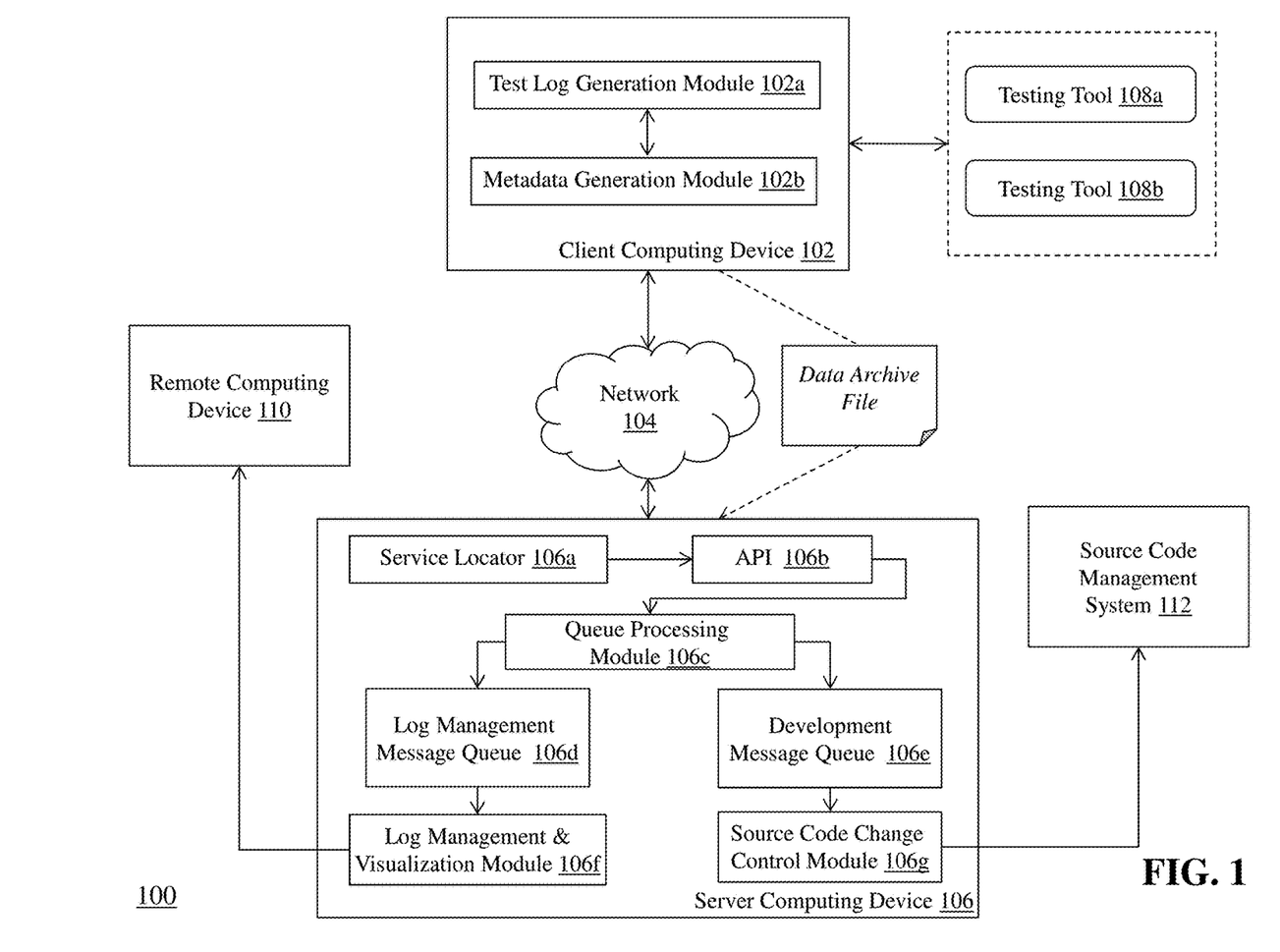
FIG. 1 is a block diagram of a system for intelligent automation of computer software testing log aggregation, analysis, and error remediation.

FIG. 1 is a block diagram of a system 100 for intelligent automation of computer software testing log aggregation, analysis, and error remediation. The system 100 includes a client computing device 102 with several computing modules including a test log generation module 102a and a metadata generation module 102b. The client computing device 102 also includes a plurality of independent software automation testing tools (i.e., testing tool 108a and 108b). The system 100 further includes a communications network 104 that couples the client computing device 102 to a server computing device 106 that includes several computing modules, including a service locator module 106a, an application programming interface (API) 106b, a queue processing module 106c, a log management message queue 106d, a development message queue 106e, a log management and visualization module 106f, and a source code change control module 106g. The system 100 also includes a remote computing device 110 and a source code management system 112 coupled to the server computing device 106.

The client computing device 102 is a combination of hardware and software modules that includes specialized hardware and/or software modules that execute on a processor and interact with memory modules of the client computing device 102 to perform functions for intelligent automation of computer software testing log aggregation, analysis, and error remediation as described herein. The client computing device 102 includes a test log generation module 102a and a metadata generation module 102b (as mentioned above) that execute on and/or interact with the processor of the client computing device 102.

In some embodiments, the test log generation module 102a and the metadata generation module 102b are specialized sets of computer software instructions programmed onto one or more dedicated processors in the client computing device 102 and can include specifically-designated memory locations and/or registers for executing the specialized computer software instructions. Although the modules 102a, 102b are shown in FIG. 1 as executing within the same client computing device 102, in some embodiments the functionality of the modules 102a, 102b can be distributed among a plurality of computing devices. As shown in FIG. 1, the client computing device 102 enables the modules 102a, 102b to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 102a, 102b is described in detail below.

The automation testing tools 108a and 108b are software applications, implemented on any of a number of operating system platforms (e.g., OS X, Windows, Linux), that are configured to automatically execute software test cases against target software applications-such as a software application under development. Exemplary automation testing tools include, but are not limited, to Selenium (available from http://www.seleniumhq.com) and Sahi (available from http://sahipro.com). The automation testing tools 108a, 108b are programmed to receive test cases that are either written in a programming language that is specific to the automation testing tool (e.g., Selenese for Selenium) and/or the tools 108a, 108b can be configured with an application programming interface (API) that receives test case instructions in another programming language (e.g., Java, C#, Ruby, Python, JavaScript, and the like) and converts the received instructions into tool-specific instructions. The automation testing tools 108a, 108b execute programmatic instructions embedded in the test cases to cause applications under development to automatically perform actions (e.g., launch user interface(s), enter input, click buttons, execute routines). The tools 108a, 108b generate data resulting from execution of the test cases, including test log information such as error messages, procedure call information, and the like. The test log generation module 102a and the metadata generation module 102b capture the data generated by the automation testing tools 108a, 108b as described herein.

The communications network 104 enables the other components of the system 100 to communicate with each other in order to perform the process of intelligent automation of computer software testing log aggregation, analysis, and error remediation as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware and software modules that includes specialized hardware and/or software modules that execute on a processor and interact with memory modules of the server computing device 106 to perform functions for intelligent automation of computer software testing log aggregation, analysis, and error remediation as described herein. The server computing device 106 includes a service locator module 106a, an API 106b, a queue processing module 106c, a log management message queue 106d, a development message queue 106e, a log management and visualization module 106f, and a source code change control module 106g (as mentioned above) that execute on and/or interact with the processor of the server computing device 106.

In some embodiments, the modules 106a-106g are specialized sets of computer software instructions programmed onto one or more dedicated processors in the server computing device 106 and can include specifically-designated memory locations and/or registers for executing the specialized computer software instructions. Although the modules 106a-106g are shown in FIG. 1 as executing within the same server computing device 106, in some embodiments the functionality of the modules 106a-106g can be distributed among a plurality of computing devices. As shown in FIG. 1, the server computing device 106 enables the modules 106a-106g to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a-106g is described in detail below.

The remote computing device 110 connects to the communications network 104 in order to communicate with the server computing device 106 to provide input and receive output relating to the process of intelligent automation of computer software testing log aggregation, analysis, and error remediation as described herein. The remote computing device 110 is coupled to a display device (not shown). For example, the remote computing device 110 can provide a detailed graphical user interface (GUI) via the display device that presents output resulting from the methods and systems described herein, where the GUI is utilized by an operator to analyze visual compilations of results from testing log aggregation, analysis, and error remediation as described herein.

Exemplary remote computing devices 110 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single remote computing device 110, it should be appreciated that the system 100 can include any number of remote computing devices.

The source code management system 112 is a computing device that tracks changes in source code and other related files during the development of a software application. For example, the source code management system 112 enables a team of developers to check out specific source code modules from a software application under development, makes changes to the code modules, and check in the changed source code modules. In some embodiments, the source code management system 112 is a source code control system and/or a version control system, such as JIRA/GitStash available from Atlassian, Inc., that provides the capability of automatically creating issue tickets that pertains to source code errors, bugs, and associated changes identified via the test log files generated during the software automation testing described herein, the tickets then assigned to software developers for remediation of the errors and iteration on the software source code.

Figure 2A:
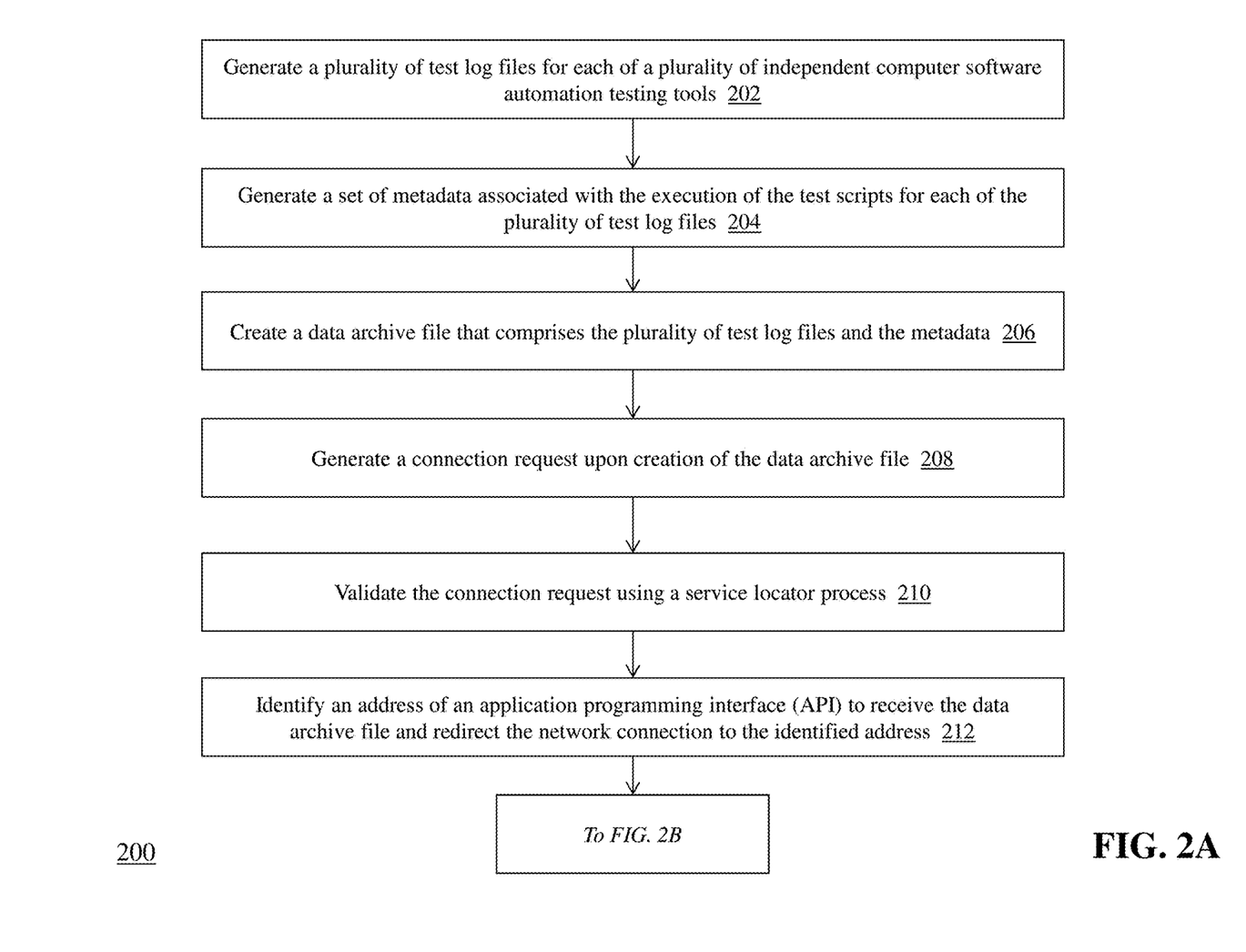
FIGS. 2A and 2B comprise a flow diagram of a method for intelligent automation of computer software testing log aggregation, analysis, and error remediation.
Figure 2B:
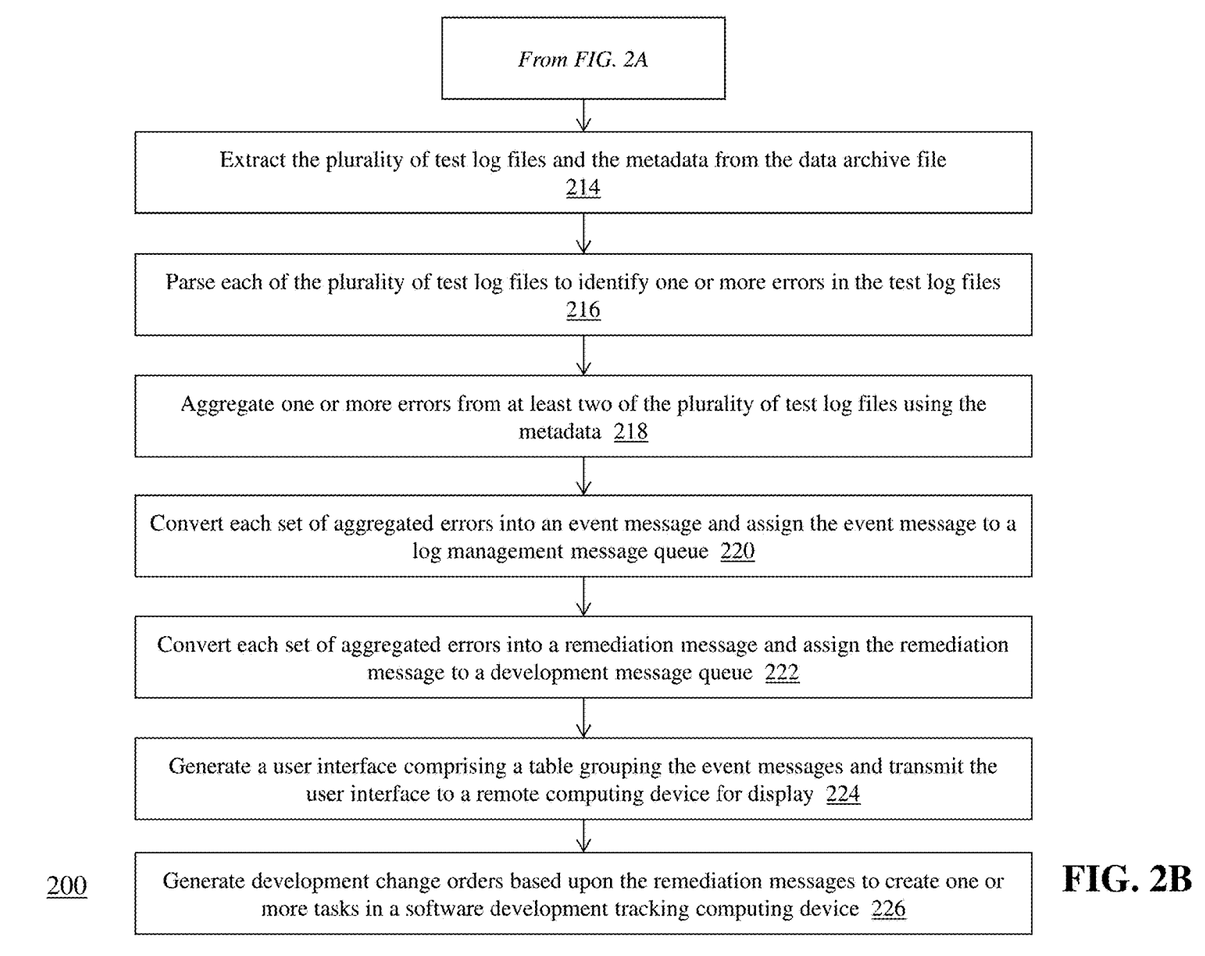

FIGS. 2A and 2B comprise a flow diagram of a method for intelligent automation of computer software testing log aggregation, analysis, and error remediation, using the system 100 of FIG. 1. The test log generation module 102a of client computing device 102 generates (202) a plurality of test log files for each of a plurality of independent computer software automation testing tools 108a, 108b. In one example, the test log generation module 102a instructs a corresponding automation testing tool 108a, 108b to perform a series of steps for each computer software test case to be executed. The module 102a launches the selected automation testing tool using a tool-specific interface, and executes the computer software test case using the automation testing tool against a software application under development. In one embodiment, the module 102a implements a ITestRunner Java interface which has one method ("run") that takes in a parameter identifying the computer software test case to be executed and returns a status of the execution along with a pointer (e.g., filename, address) to a log file generated as a result of executing the test case. The ITestRunner interface has one implementation class—"Runner"—to establish the execution of the test case. The "Runner" class takes control of launching the automation testing tool, executing the test case, and determining the status of the test case execution. The "run" method of the "Runner" class gets a reference to the automation testing tool for the current test case, which assists the module 102a in communicating with the automation testing tool.

Because each computer software automation testing tool may have different ways to execute test cases, in order to interact with a specific automation testing tool to launch, execute, and get test results, the test log generation module 102a requires each tool to implement a tool-specific interface. To accomplish this, the test log generation module 102a can implement an iTools interface class that has certain methods to interact with each tool (e.g., to start the tool, execute a test case, obtain the test results, etc.). Then, each tool can implement the iTools interface class with tool-specific features that define the tool's individual operation for launching the tool, executing the test case, and returning results and/or status of the test case).

In addition, while implementing the iTools interface, the module 102a receives dependencies associated with the automation testing tool that is executing the test case. For example, each automation testing tool has differences with respect to, e.g., location of the tool, libraries associated with the tool, and the like. In one embodiment, the implementations of the iTools interface uses the Ant build language to load dependencies dynamically and execute custom tasks at runtime. The test log generation module 102a can leverage a build.xml file of Ant to take control of the tool's execution of tasks. As a result, the module 102a can take advantage of error handling when it calls tasks at runtime because errors thrown by the automation testing tools when executing the test cases are captured by the test log generation module 102a as it wraps the Ant execution. Specific details of the computer software automation testing tool test case execution are described in U.S. patent application Ser. No. 15/806,163, titled "Automated Intelligent Execution of Computer Software Test Cases," which is incorporated herein by reference.

Figure 3:
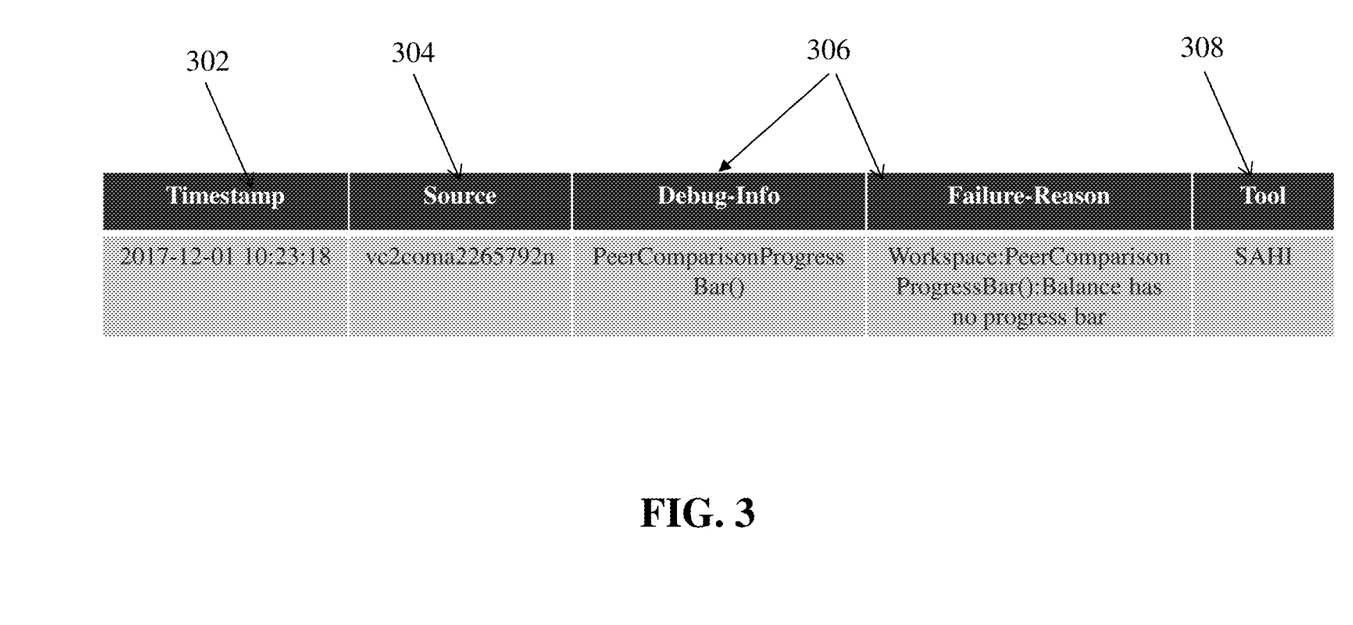
FIG. 3 is an exemplary test log message.

A test log typically contains a plurality of messages that capture the series of actions and associated results as performed by the automation testing tool when executing the test script. For example, the test log can contain a plurality of messages arranged in a sequence (usually, organized by timestamp) that describe an action or resource being tested and the result of the test step. An example test log message is shown in FIG. 3, which includes a timestamp 302, a source code reference name 304 (i.e., which source code module was being tested), an error message 306 (e.g., including debug-info and failure-reason), and the name of a testing tool 308 used to execute the test case that generated the message.

During execution of the computer software test cases using the test log generation module 102a, the metadata generation module 102b generates (204) a set of metadata associated with the execution of the test scripts for each of the plurality of test log files. The metadata describes aspects of the execution of the test cases/scripts that are then correlated to the test log files generated by the test log generation module 102a as described herein. Exemplary metadata can include, but is not limited to, timestamp associated with the test execution, identification of the automation testing tool used to execute the test case, identification of source code module(s) being tested during execution of the test case, identification of software application being tested during execution of the test case, file location of the test log(s) generated during execution of the test case, and the like.

Turning back to FIG. 2A, once the test log generation module 102a generates the test log file(s) and the metadata generation module 102b generates the metadata for each test log file, the test log generation module 102a creates (206) a data archive file in the memory of the client computing device 102 that comprises the plurality of test log files and the metadata. For example, the module 102a extracts the test log files from their corresponding file location(s) and combines them with the metadata files generated by the module 102b into a data archive file (e.g., a .zip or .jar file). The module 102a stores the data archive file in a designated memory location. When the data archive file has been created, the test log generation module 102a automatically generates (208) a connection request for the server computing device 106. For example, the module 102a can detect that the data archive file has been written to the designated memory location (e.g., by periodically scanning the memory location to see if it contains a file, or a specifically-named/designated file) and immediately generate the connection request to the server computing device 106. The server computing device 106 exposes a Representational State Transfer (REST) application programming interface for consuming subsystems to send the data archive files for further processing and storing. In one example, the module 102a establishes an HTTP connection with the service locator module 106a on server computing device 106 (e.g., by retrieving an IP address and/or URL associated with the service locator module 106a that is stored in local memory and issuing an HTTP POST command to that address—where the command contains a reference to the data archive file (i.e., a JSON message) previously created and stored at the client computing device 102.

When the service locator module 106a receives the connection request from the test log generation module 102a, the service locator module 106a validates (210) the connection request (typically, using a secure authentication and handshake process to identify the client computing device 102 as genuine and verify that the data being transmitted from the client computing device 102 is legitimate) and then identifies (212) a URL that points to a REST-based application programming interface process 106b executing on the server computing device 106 to receive the test log data and metadata from the client computing device 102. For example, the service locator module 106a can determine an API 106b that is available to receive the request and/or has the proper capabilities (e.g., depending on the type of test log data being received) to analyze the incoming data. In one embodiment, the service locator module 106a makes a POST call to the URL for the API 106b which redirects the network connection from the client computing device 102 to the API 106b. In some embodiments, the API 106b is a specialized programming interface (e.g., written in NodeJS for the non-blocking I/O and asynchronous functionality that it offers) that is capable of interpreting the messages exchanged with the client computing device 102 (including the specific test log data and metadata) in order to perform the computer software test log aggregation, analysis, and error remediation as described herein. It should be appreciated that the API 106b can be configured to interpret messages and log files from multiple different automation testing tools simultaneously.

Turning to FIG. 2B, the API 106b extracts (214) the plurality of test log files and the metadata from the received data archive file and writes it into a memory location monitored by a the queue processing module 106c, a software module developed using Java™ Native Input-Output, for any new files written into the memory location. The queue processing module 106c reads the metadata information from the log files and metadata created by the API 106b, and communicates a message to the log management message queue 106d and the development message queue 106e. The log management message queue 106d captures the new log file information received from module 106c and parses (216) each of the plurality of test log files to identify one or more errors in the test log files. For example, the queue processing module 106c can scan through the messages contained in each log file and mark/flag specific messages as corresponding to errors in test case execution generated by the testing tools 108a, 108b. A message that corresponds to an error may comprise a particular syntax, message body (e.g., item 306 in FIG. 3) or other indicator that denotes the message is a log error. In some embodiments, the test log files generated by the automation testing tools 108a, 108b are comprised only of error messages.

Figure 4:
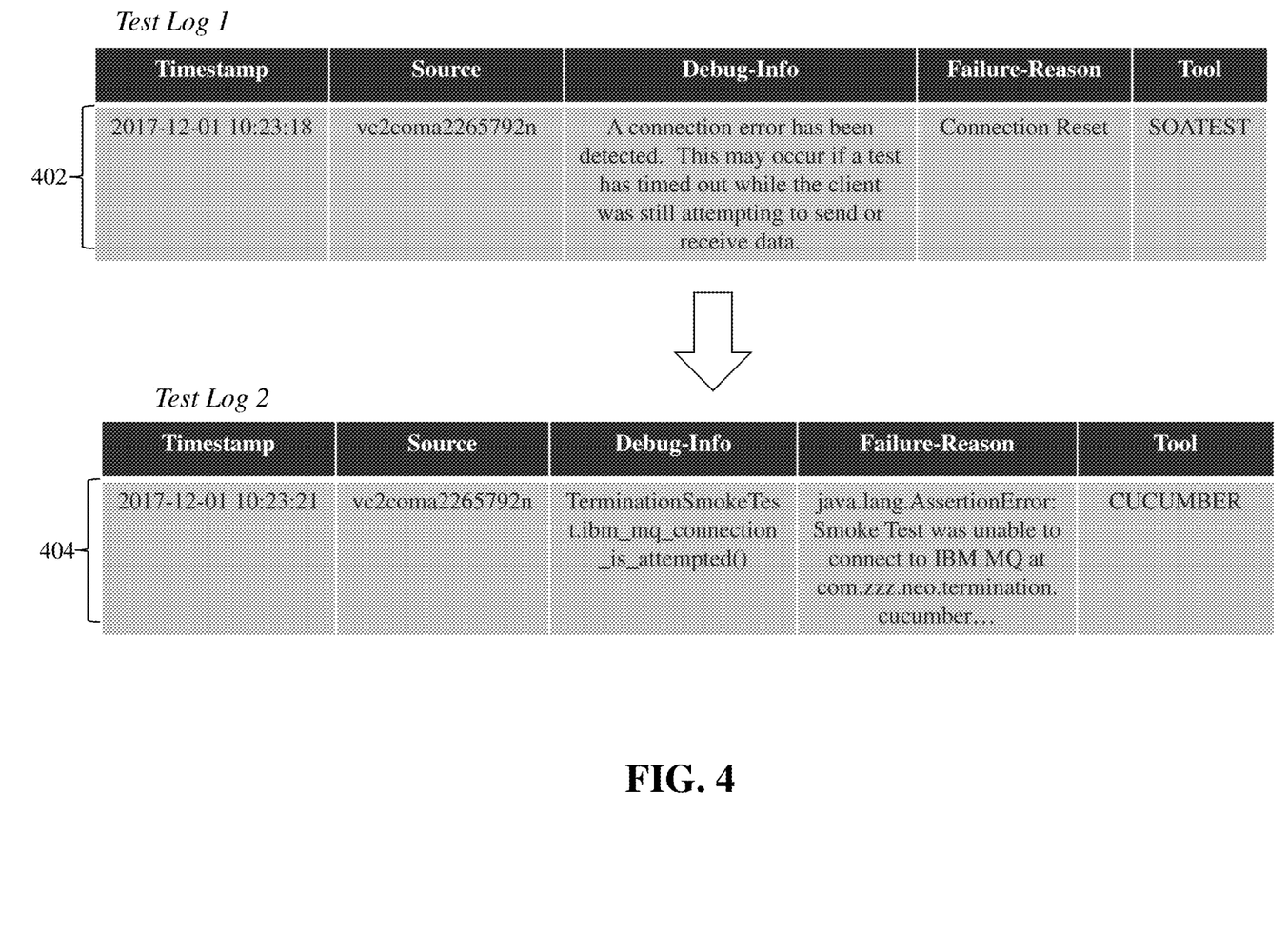
FIG. 4 is a diagram of aggregating error messages from two different test log files.

The queue processing module 106c then aggregates (218) one or more errors from at least two of the plurality of test log files using the metadata. For example, when the queue processing module 106c receives test log files from two different automation testing tools 108a, 108b that executed test cases against the same application and/or source code module(s), the queue processing module 106c can synthesize the error messages contained in each test log file so that error messages resulting from the same source code module and/or UI element are associated with each other. FIG. 4 is a diagram of aggregating error messages from two different test log files. As shown in FIG. 4, the queue processing module 106c determines that error message 402 from Test Log 1 (which was generated by a SOATEST software automation testing tool) is associated with error message 404 from Test Log 2 (which was generated by a CUCUMBER software automation testing tool) by, e.g., matching the timestamp and/or the source identifiers in each test log message. For example, the queue processing module 106c can determine that the two test log message are related because they occurred within a predetermined timeframe of each other (e.g., 3 seconds) and call to the same source code module (e.g., vc2coma2265792n). The queue processing module 106c aggregates the two error messages into a set of aggregated errors. It should be appreciated that a set of aggregated error messages comprise a plurality of messages from one or more of the test log files (e.g., three messages from one test log file and two messages from another test log file), or a set of aggregated error messages can comprise messages from several different test log files (e.g., one or more messages from three or more test log files).

Figure 5A:
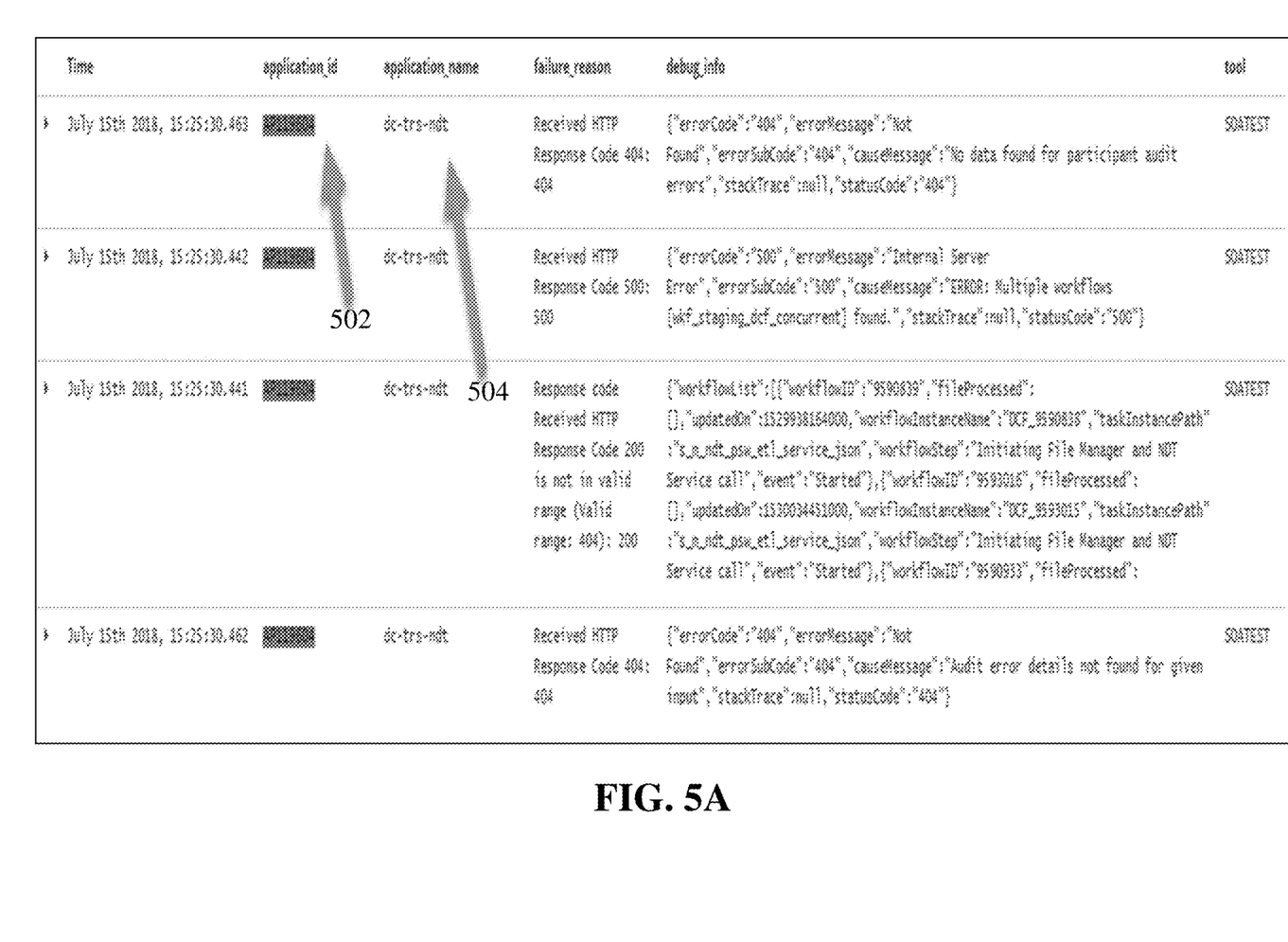
FIG. 5A is a screenshot of a user interface depicting aggregation of error messages from a single application in two different test log files.
Figure 5B:
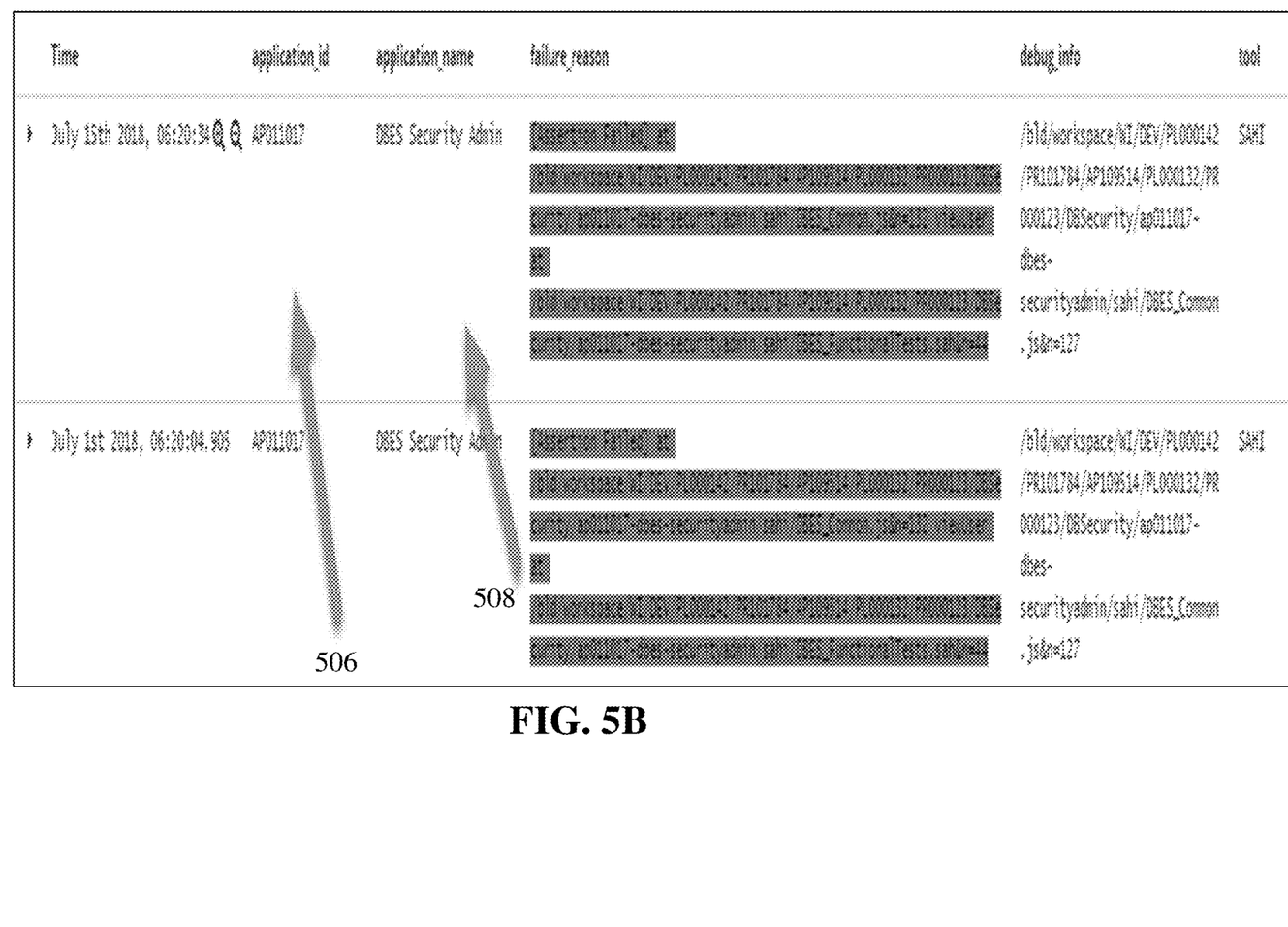
FIG. 5B is a screenshot of another user interface depicting aggregation of error messages from a single application in two different test log files.

In some embodiments, the queue processing module 106c utilizes a fingerprinting technique that enables linking of test log messages from different log files within a single application. FIG. 5A is a screenshot of a user interface depicting aggregation of error messages from a single application in two different test log files, and FIG. 5B is a screenshot of another user interface depicting aggregation of error messages from a single application in two different test log files. As shown in FIG. 5A, the module 106c links together several web services layer errors based upon a specific application_id 502 (e.g., AP119604) and application_name 504 (e.g., dc-trs-ndt). Similarly, in FIG. 5B, the module 106c links together several user interface application errors based upon a specific application_id 506 (e.g., AP011017) and application_name 508 (e.g., DBES Security Admin).

The queue processing module 106c then converts (220) each set of aggregated errors into an event message and assigns the event message to log management queue 106d executing on server computing device 106. In one embodiment, the queue processing module 106c can wrap the set of aggregated errors in a JSON file and assign the JSON file to the log management queue 106d by, e.g., storing the JSON file in a predesignated file location that is being monitored by the log management queue 106d process. In another embodiment, the queue processing module 106c can add the set of aggregated errors to a .zip file and store the .zip file in the predesignated file location. The log management queue 106d process listens for new files to be written to the predesignated file location and when the event message is written as indicated above, the log management queue 106d captures the event message from the file location and automatically transmits the event message to the log management and visualization module 106f. In some embodiments, the log management queue 106d is a first-in-first-out (FIFO) process where event messages are serially processed by the queue as they arrive at the predesignated file location.

In a similar fashion, the queue processing module 106c converts (222) each set of aggregated errors into a remediation message and assigns the remediation message to the development message queue 106e executing on the server computing device 106. The queue processing module 106c stores the remediation messages file in a predesignated file location that is being monitored by the development message queue 106e process and when the file is stored, the development message queue 106e captures the remediation message from the file location and automatically transmits the remediation message to the source code change control module 106g.

Figure 6:
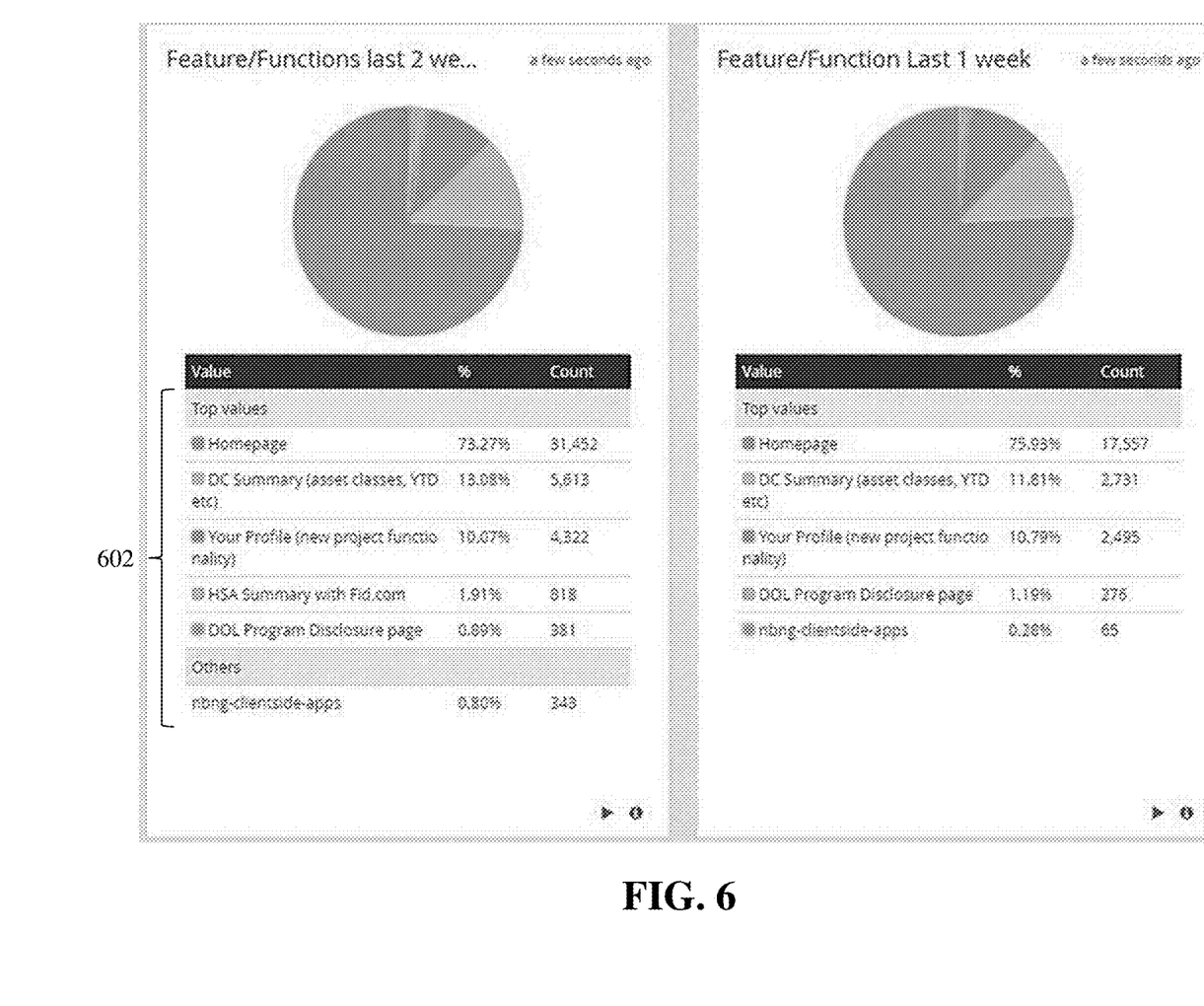
FIG. 6 is a screenshot of an exemplary user interface generated by the system.

After receiving event messages from the log management queue 106e, the log management and visualization module 106f generates (224) a user interface comprising a table grouping the event messages based upon the test execution characteristics stored in the metadata and transmits the user interface to a remote computing device for display. FIG. 6 is a screenshot of an exemplary user interface generated by the log management and visualization module 106f. As shown in FIG. 6, the user interface generated by the module 106f comprises, e.g., a pie graph and a table that identifies a number of different application functions 602 for which one or more test automation scripts were executed the automation testing tools during a predetermined time period (e.g., the last one week, last two weeks), along with a count and corresponding percentage of the total count for each application function. For example, the Homepage function was tested over 31,000 times by the automation testing tools in the last two weeks. By clicking on each entry in the table, the underlying event message information (as in FIG. 4) can be viewed for each application function.

Similarly, after receiving remediation messages from the development message queue 106e, the source code change control module 106g generates (226) development change orders based upon the remediation messages. Each development change order is a data structure comprising programmatic instructions that, when executed by the source code change control module 106g, create one or more tasks in a software development tracking computing device to resolve one or more errors in the remediation messages by changing at least a portion of the development source code base. For example, the source code change control module 106g can automatically create tasks in JIRA that specifically identify the source code module/application/function that encountered the error and provide information used by a developer to remediate the error in subsequent automation testing executions.

Figure 7:
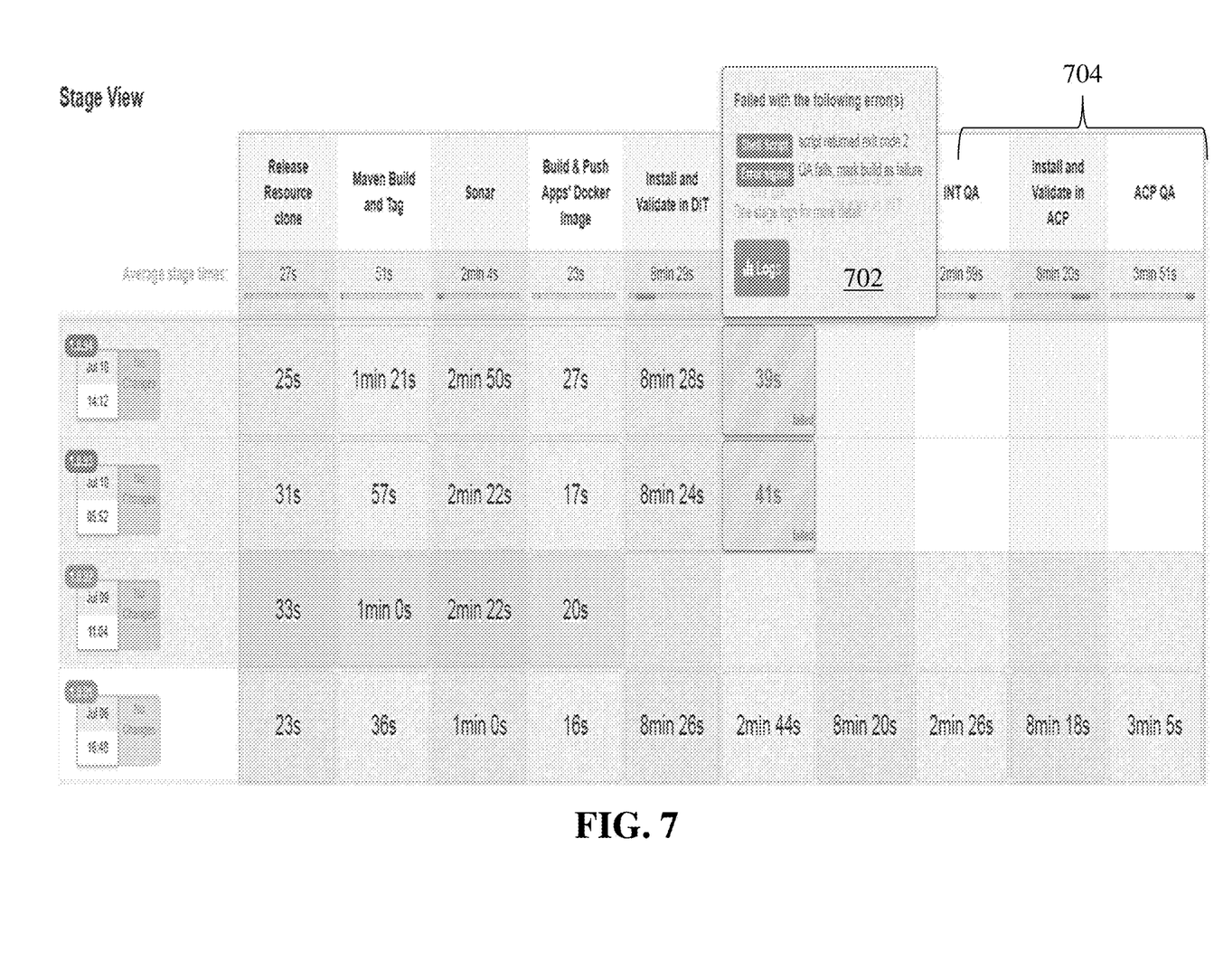
FIG. 7 is a screenshot generated by a software development tracking computing device that receives instructions from the source code change control module to stop deployment of a software application build that contains one or more errors.

FIG. 7 is a screenshot generated by a software development tracking computing device that receives instructions from the source code change control module 106g to stop deployment of a software application build that contains one or more errors as captured by the system 100. As shown in FIG. 7, the source code change control module 106g identifies specific errors 702 resulting from execution of test automation scripts on a code build under test and does not promote the code build to further stages of QA and deployment (e.g., 704).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for intelligent automation of computer software testing log aggregation, analysis, and error remediation, the system comprising:
  a client computing device having a memory for storing computer-executable instructions and a processor that executes the computer-executable instructions to:
    generate a plurality of test log files for each of a plurality of independent computer software automation testing tools that execute one or more test scripts against a development source code base, each test log file comprising one or more errors generated by execution of the test scripts;
    generate a set of metadata associated with the execution of the test scripts for each of the plurality of test log files, the metadata comprising one or more test execution characteristics;

create a data archive file in the memory that comprises the plurality of test log files and the metadata; and
automatically generate a connection request for a server computing device upon creation of the data archive file;
the server computing device having a memory for storing computer-executable instructions and a processor that executes the computer-executable instructions to:
validate, using a service locator process, the connection request received from the client computing device via a network connection;
identify an address of an application programming interface executing on the server computing device to receive the data archive file and redirect the network connection to the identified address of the application programming interface;
extract, by the application programming interface, the plurality of test log files and the metadata from the data archive file;
parse, by the application programming interface, each of the plurality of test log files to identify one or more errors in the test log files;
aggregate, by the application programming interface, one or more errors from at least two of the plurality of test log files using the metadata;
convert, by the application programming interface, each set of aggregated errors into an event message and assign the event message to a log management message queue executing on the server computing device, the log management message queue automatically transmitting each event message to a log management and visualization module executing on the server computing device;
convert, by the application programming interface, each set of aggregated errors into a remediation message and assign the remediation message to a development message queue executing on the server computing device, the development message queue automatically transmitting each remediation message to a source code change control module executing on the server computing device;
generate, by the log management and visualization module, a user interface comprising a table grouping the event messages based upon the test execution characteristics stored in the metadata and transmit the user interface to a remote computing device for display; and
generate, by the source code change control module, development change orders based upon the remediation messages, each development change order comprising programmatic instructions that, when executed by the source code change control module, create one or more tasks in a software development tracking computing device to resolve one or more errors in the remediation messages by changing at least a portion of the development source code base.

2. The system of claim 1, wherein the address of an application programming interface executing on the server computing device comprises an HTTP address.

3. The system of claim 1, wherein parsing each of the plurality of test log files to identify one or more errors comprises, for each test log file:
determining a computer software automation testing tool that generated the test log file, based upon the metadata associated with the test log file;
configuring the application programming interface to interpret the test log file using one or more rules specific to the determined computer software automation testing tool;
scanning each line of the test log file to match one or more of: an error keyword or an error ID in the line to one or more of the rules; and
extracting the lines of the test log file that comprise an error keyword or an error ID that match the rules as identified errors.

4. The system of claim 1, wherein aggregating one or more errors from at least two of the plurality of test log files comprises:
determining that one or more identified errors from each of two or more test log files result from a single error event, based upon one or more of: a timestamp or an application name associated with the identified errors in the metadata; and
grouping the identified errors together based upon the timestamp or the application name.

5. The system of claim 4, wherein the identified errors are grouped into a hierarchy arranged according to the computer software automation testing tool that generated the error.

6. The system of claim 1, wherein converting each set of aggregated errors into an event message comprises wrapping the set of aggregated errors into a messaging protocol used by the log management message queue, including generating one or more packets each comprising a header, a footer, and a body with at least a portion of the set of aggregated errors.

7. The system of claim 6, wherein the log management message queue automatically transmits each event message to the log management and visualization module upon detecting that the event message has been placed into the log management message queue.

8. The system of claim 1, wherein converting each set of aggregated errors into a remediation message comprises wrapping the set of aggregated errors into a messaging protocol used by the development message queue, including generating one or more packets each comprising a header, a footer, and a body with at least a portion of the set of aggregated errors.

9. The system of claim 8, wherein the development message queue automatically transmits each remediation message to the source code change control module upon detecting that the remediation message has been placed into the development message queue.

10. A computerized method of intelligent automation of computer software testing log aggregation, analysis, and error remediation, the method comprising:
generating, by a client computing device, a plurality of test log files for each of a plurality of independent computer software automation testing tools that execute one or more test scripts against a development source code base, each test log file comprising one or more errors generated by execution of the test scripts;
generating, by the client computing device, a set of metadata associated with the execution of the test scripts for each of the plurality of test log files, the metadata comprising one or more test execution characteristics;
creating, by the client computing device, a data archive file in the memory that comprises the plurality of test log files;
automatically generating, by the client computing device, a connection request for a server computing device upon creation of the data archive file;

validating, by the server computing device using a service locator process, the connection request received via a network connection from the client computing device;

identifying, by the server computing device, an address of an application programming interface executing on the server computing device to receive the data archive file and redirect the network connection to the identified address of the application programming interface;

extracting, by the application programming interface, the plurality of test log files and the metadata from the data archive file;

parsing, by the application programming interface, each of the plurality of test log files to identify one or more errors in the test log files;

aggregating, by the application programming interface, one or more errors from at least two of the plurality of test log files using the metadata;

converting, by the application programming interface, each set of aggregated errors into an event message and assign the event message to a log management message queue executing on the server computing device, the log management message queue automatically transmitting each event message to a log management and visualization module executing on the server computing device;

converting, by the application programming interface, each set of aggregated errors into a remediation message and assign the remediation message to a development message queue executing on the server computing device, the development message queue automatically transmitting each remediation message to a source code change control module executing on the server computing device;

generating, by the log management and visualization module, a user interface comprising a table grouping the event messages based upon the test execution characteristics stored in the metadata and transmit the user interface to a remote computing device for display; and generating, by the source code change control module, development change orders based upon the remediation messages, each development change order comprising programmatic instructions that, when executed by the source code change control module, create one or more tasks in a software development tracking computing device to resolve one or more errors in the remediation messages by changing at least a portion of the development source code base.

11. The method of claim 10, wherein the address of an application programming interface executing on the server computing device comprises an HTTP address.

12. The method of claim 10, wherein parsing each of the plurality of test log files to identify one or more errors comprises, for each test log file:

determining a computer software automation testing tool that generated the test log file, based upon the metadata associated with the test log file;

configuring the application programming interface to interpret the test log file using one or more rules specific to the determined computer software automation testing tool;

scanning each line of the test log file to match one or more of: an error keyword or an error ID in the line to one or more of the rules; and extracting the lines of the test log file that comprise an error keyword or an error ID that match the rules as identified errors.

13. The method of claim 10, wherein aggregating one or more errors from at least two of the plurality of test log files comprises:

determining that one or more identified errors from each of two or more test log files result from a single error event, based upon one or more of: a timestamp or an application name associated with the identified errors in the metadata; and grouping the identified errors together based upon the timestamp or the application name.

14. The method of claim 13, wherein the identified errors are grouped into a hierarchy arranged according to the computer software automation testing tool that generated the error.

15. The method of claim 10, wherein converting each set of aggregated errors into an event message comprises wrapping the set of aggregated errors into a messaging protocol used by the log management message queue, including generating one or more packets each comprising a header, a footer, and a body with at least a portion of the set of aggregated errors.

16. The method of claim 15, wherein the log management message queue automatically transmits each event message to the log management and visualization module upon detecting that the event message has been placed into the log management message queue.

17. The method of claim 10, wherein converting each set of aggregated errors into a remediation message comprises wrapping the set of aggregated errors into a messaging protocol used by the development message queue, including generating one or more packets each comprising a header, a footer, and a body with at least a portion of the set of aggregated errors.

18. The method of claim 17, wherein the development message queue automatically transmits each remediation message to the source code change control module upon detecting that the remediation message has been placed into the development message queue.

* * * * *